United States Patent
Taherzadeh Boroujeni et al.

(10) Patent No.: US 11,950,212 B2
(45) Date of Patent: Apr. 2, 2024

(54) TIMING ADVANCE SIGNALING FOR MULTI-TRANSMIT RECEIVE POINT OPERATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/117,009

(22) Filed: Dec. 9, 2020

(65) Prior Publication Data

US 2021/0185670 A1 Jun. 17, 2021

Related U.S. Application Data

(60) Provisional application No. 62/947,348, filed on Dec. 12, 2019.

(51) Int. Cl.
*H04W 72/0446* (2023.01)
*H04W 72/23* (2023.01)
*H04W 74/0833* (2024.01)

(52) U.S. Cl.
CPC ....... *H04W 72/0446* (2013.01); *H04W 72/23* (2023.01); *H04W 74/0833* (2013.01)

(58) Field of Classification Search
CPC ........... H04W 72/0446; H04W 72/042; H04W 74/0833
See application file for complete search history.

(56) References Cited

U.S. PATENT DOCUMENTS

| 2014/0112276 A1* | 4/2014 | Ahn | H04W 74/0833 370/329 |
| 2016/0100422 A1* | 4/2016 | Papasakellariou | H04L 1/1822 370/329 |

(Continued)

FOREIGN PATENT DOCUMENTS

| CN | 103037516 A | 4/2013 |
| CN | 109923844 A | 6/2019 |

(Continued)

OTHER PUBLICATIONS

Huawei., et al., "Maintenance of Uplink Time Alignment in NR", 3GPP Draft, 3GPPTSG-RAN WG2 #99bis meeting, R2-1711438 Maintenance of Uplink Time Alignment in NR, 3rd Generation Partnership Project (3GPP), Mobile Competence Centre, 650, Route Des Lucioles, F-06921 Sophia-Antipolis Cedex, Fran vol. RAN WG2, No. Prague, Czech Republic, Oct. 9, 2017-Oct. 13, 2017 Oct. 8, 2017 (Oct. 8, 2017), XP051343423, 3 Pages, Retrieved from the Internet: URL:http://www.3gpp.org/ftp/Meetings_3GPPSYNC/RAN2/Docs/[retrieved on Oct. 8, 2017].

(Continued)

*Primary Examiner* — Siren Wei
(74) *Attorney, Agent, or Firm* — QUALCOMM Incorporated

(57) ABSTRACT

Various aspects of the present disclosure generally relate to wireless communication. In some aspects, a base station may determine a set of time differences for a set of physical random access channel signals received at a set of transmit receive points (TRPs); determine a quantity of timing advances to apply to a multi-TRP transmission based at least in part on the set of time differences; and transmit, to a user equipment, an indication of the quantity of timing advances to apply to the multi-TRP transmission. Numerous other aspects are provided.

20 Claims, 10 Drawing Sheets

(56) References Cited

U.S. PATENT DOCUMENTS

| | | | |
|---|---|---|---|
| 2018/0007646 A1* | 1/2018 | Kwon | H04W 36/0055 |
| 2018/0042052 A1* | 2/2018 | Harjula | H04W 74/0833 |
| 2020/0137730 A1* | 4/2020 | Zhang | H04W 72/23 |
| 2021/0160880 A1* | 5/2021 | Zhang | H04L 5/0064 |

FOREIGN PATENT DOCUMENTS

| | | |
|---|---|---|
| CN | 110073626 A | 7/2019 |
| EP | 2716114 B1 | 3/2016 |

OTHER PUBLICATIONS

International Search Report and Written Opinion—PCT/US2020/064300—ISA/EPO—dated Apr. 9, 2021.

* cited by examiner

TIMING ADVANCE SIGNALING FOR MULTI-TRANSMIT RECEIVE POINT OPERATION

CROSS-REFERENCE TO RELATED APPLICATION

This Patent Application claims priority to U.S. Provisional Patent Application No. 62/947,348, filed on Dec. 12, 2019, entitled "TIMING ADVANCE SIGNALING FOR MULTI-TRANSMIT RECEIVE POINT OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for timing advance signaling for multi-transmit receive point operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include determining a set of time differences for a set of physical random access channel signals received at a set of transmit receive points (TRPs); determining a quantity of timing advances to apply to a multi-TRP transmission based at least in part on the set of time differences; and transmitting, to a user equipment (UE), an indication of the quantity of timing advances to apply to the multi-TRP transmission.

In some aspects, a method of wireless communication, performed by a UE, may include receiving an indication of a quantity of timing advances to apply to one or more multi-TRP transmissions; and transmitting, to a set of TRPs, the one or more multi-TRP transmissions in accordance with one or more timing advances based at least in part on the indication of the quantity of timing advances.

In some aspects, a BS for wireless communication may include memory and one or more processors operatively coupled to the memory. The memory and the one or more processors may be configured to determine a set of time differences for a set of physical random access channel signals received at a set of TRPs; determine a quantity of timing advances to apply to a multi-TRP transmission based at least in part on the set of time differences; and transmit, to a UE, an indication of the quantity of timing advances to apply to the multi-TRP transmission.

In some aspects, a UE for wireless communication may include memory and one or more processors operatively coupled to the memory. The memory and the one or more processors may be configured to receive an indication of a quantity of timing advances to apply to one or more multi-TRP transmissions; and transmit, to a set of TRPs, the one or more multi-TRP transmissions in accordance with one or more timing advances based at least in part on the indication of the quantity of timing advances.

In some aspects, a non-transitory computer-readable medium may store one or more instructions for wireless communication. The one or more instructions, when executed by one or more processors of a BS, may cause the one or more processors to determine a set of time differences for a set of physical random access channel signals received at a set of TRPs; determine a quantity of timing advances to apply to a multi-TRP transmission based at least in part on the set of time differences; and transmit, to a UE, an indication of the quantity of timing advances to apply to the multi-TRP transmission.

In some aspects, a non-transitory computer-readable medium may store one or more instructions for wireless communication. The one or more instructions, when executed by one or more processors of a UE, may cause the one or more processors to receive an indication of a quantity of timing advances to apply to one or more multi-TRP transmissions; and transmit, to a set of TRPs, the one or more multi-TRP transmissions in accordance with one or more timing advances based at least in part on the indication of the quantity of timing advances.

In some aspects, an apparatus for wireless communication may include means for determining a set of time differences for a set of physical random access channel signals received at a set of TRPs; means for determining a quantity of timing advances to apply to a multi-TRP transmission based at least in part on the set of time differences; and means for transmitting, to a UE, an indication of the quantity of timing advances to apply to the multi-TRP transmission.

In some aspects, an apparatus for wireless communication may include means for receiving an indication of a quantity of timing advances to apply to one or more multi-TRP transmissions; and means for transmitting, to a set of TRPs, the one or more multi-TRP transmissions in accordance with one or more timing advances based at least in part on the indication of the quantity of timing advances.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
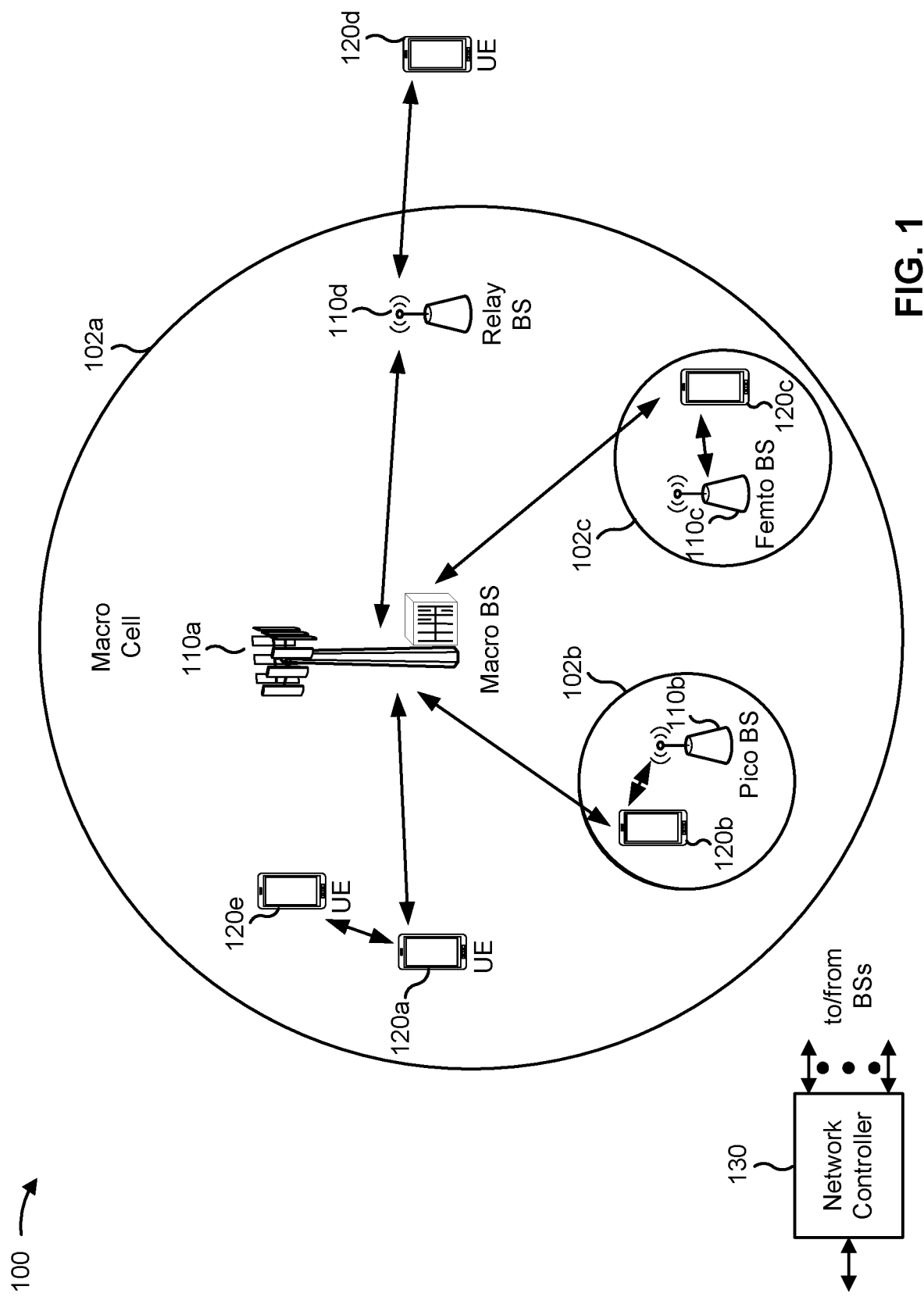
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
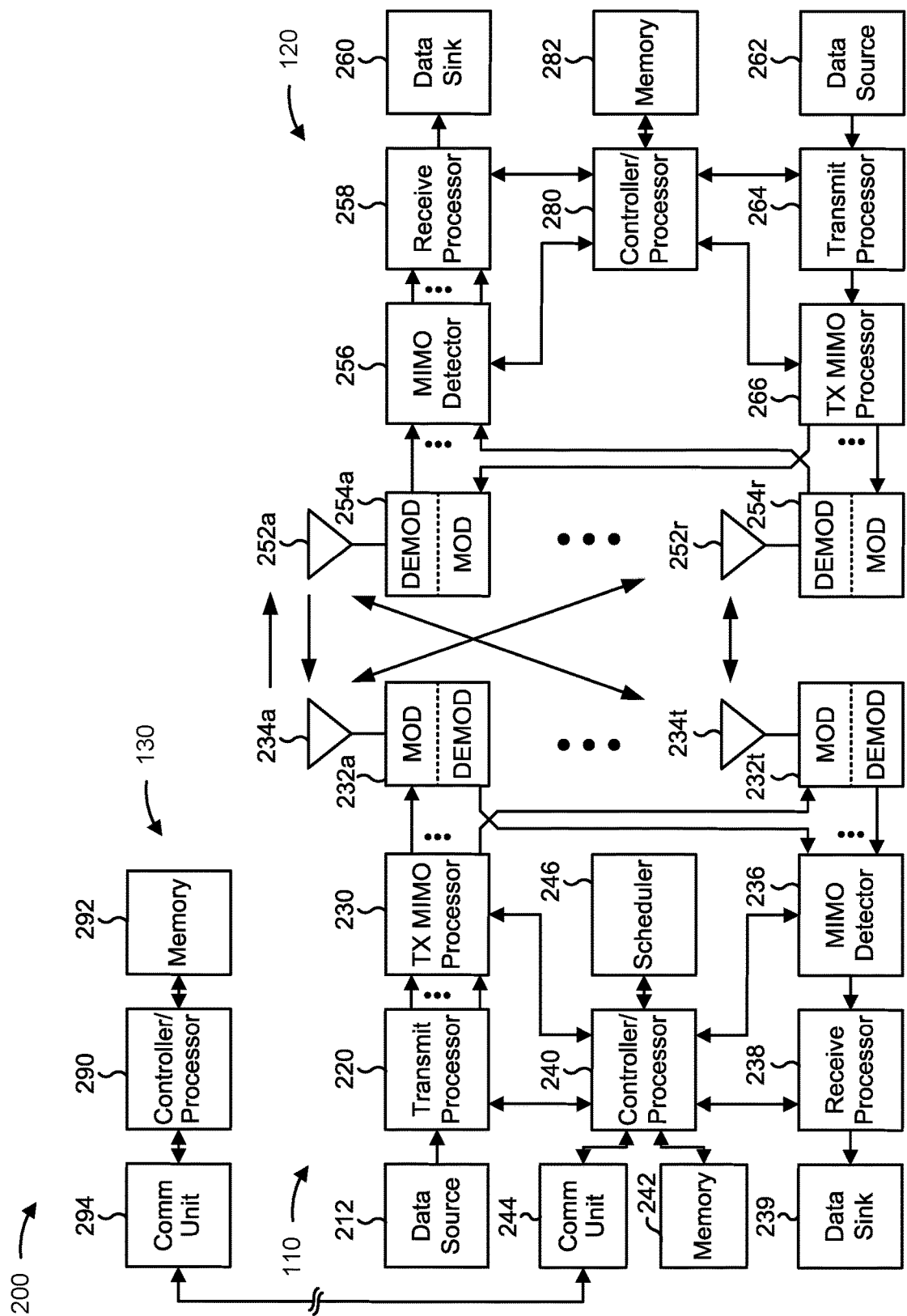
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with timing advance signaling for multi-TRP operation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving an indication of a quantity of timing advances to apply to one or more multi-TRP transmissions, means for transmitting, to a set of TRPs (e.g., BSs 110), the one or more multi-TRP transmissions in accordance with one or more timing advances based at least in part on the indication of the quantity of timing advances, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a set of time differences for a set of physical random access channel signals received at a set of TRPs, means for determining a quantity of timing advances to apply to a multi-TRP transmission based at least in part on the set of time differences, means for transmitting, to a UE (e.g., UE 120), an indication of the quantity of timing advances to apply to the multi-TRP transmission, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
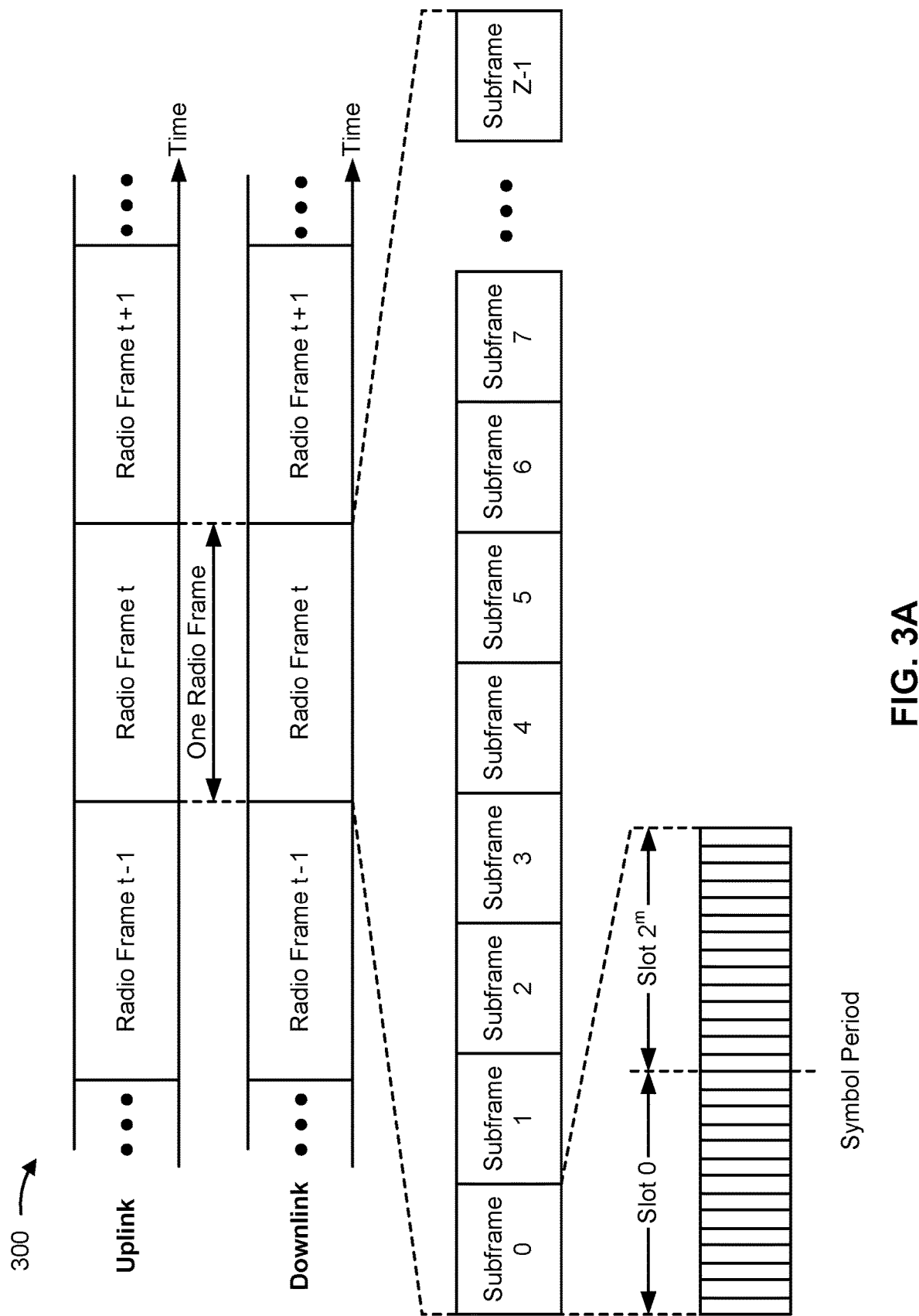
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
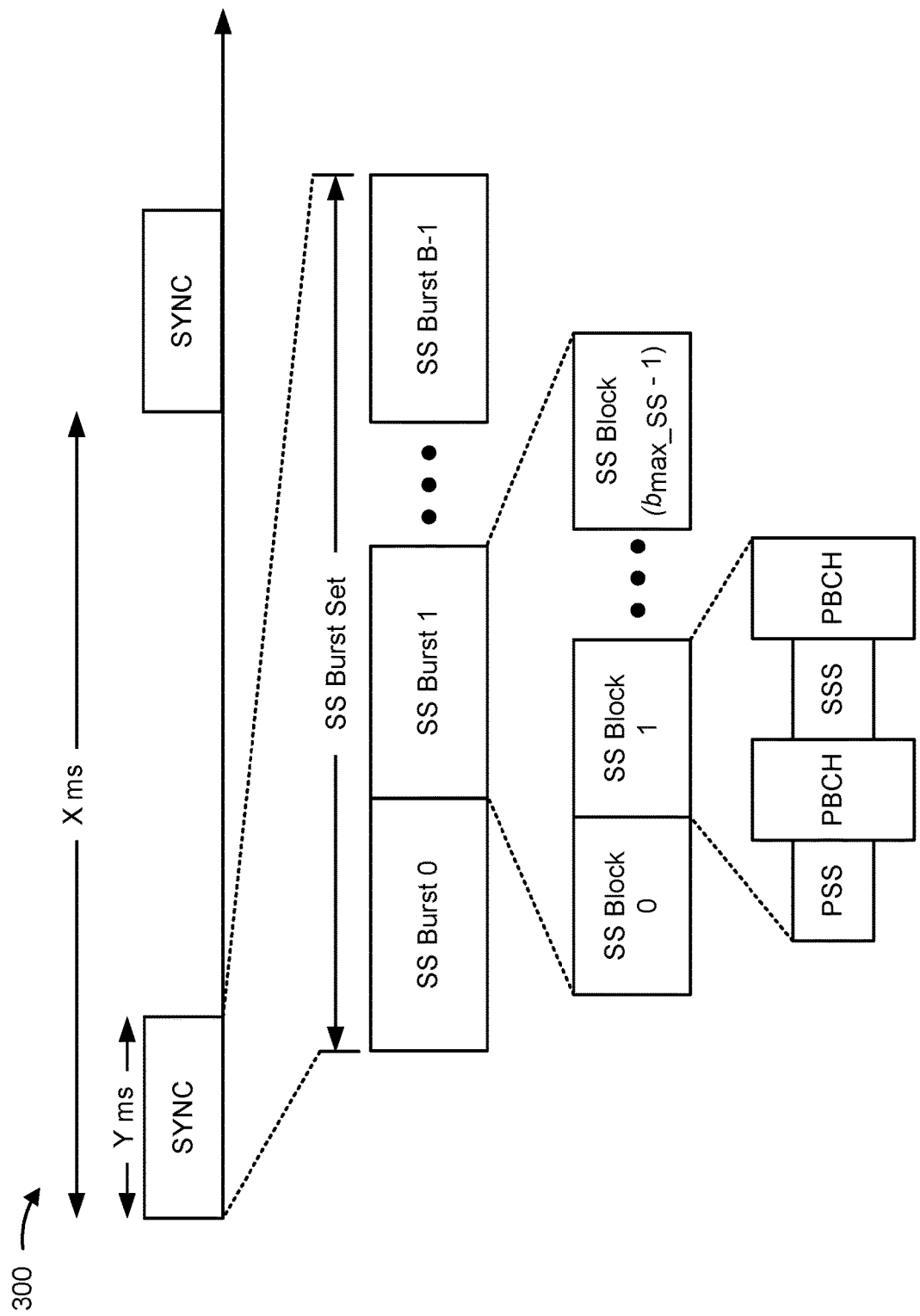
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
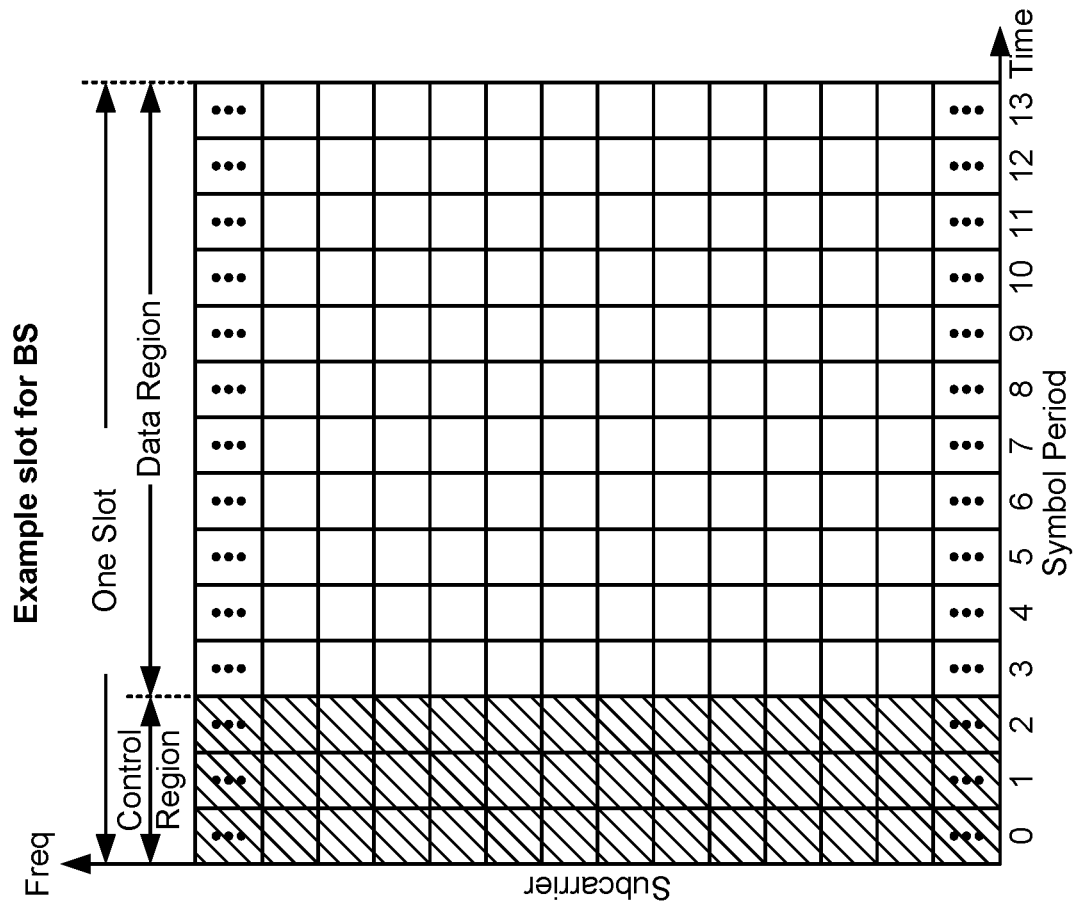
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-and-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
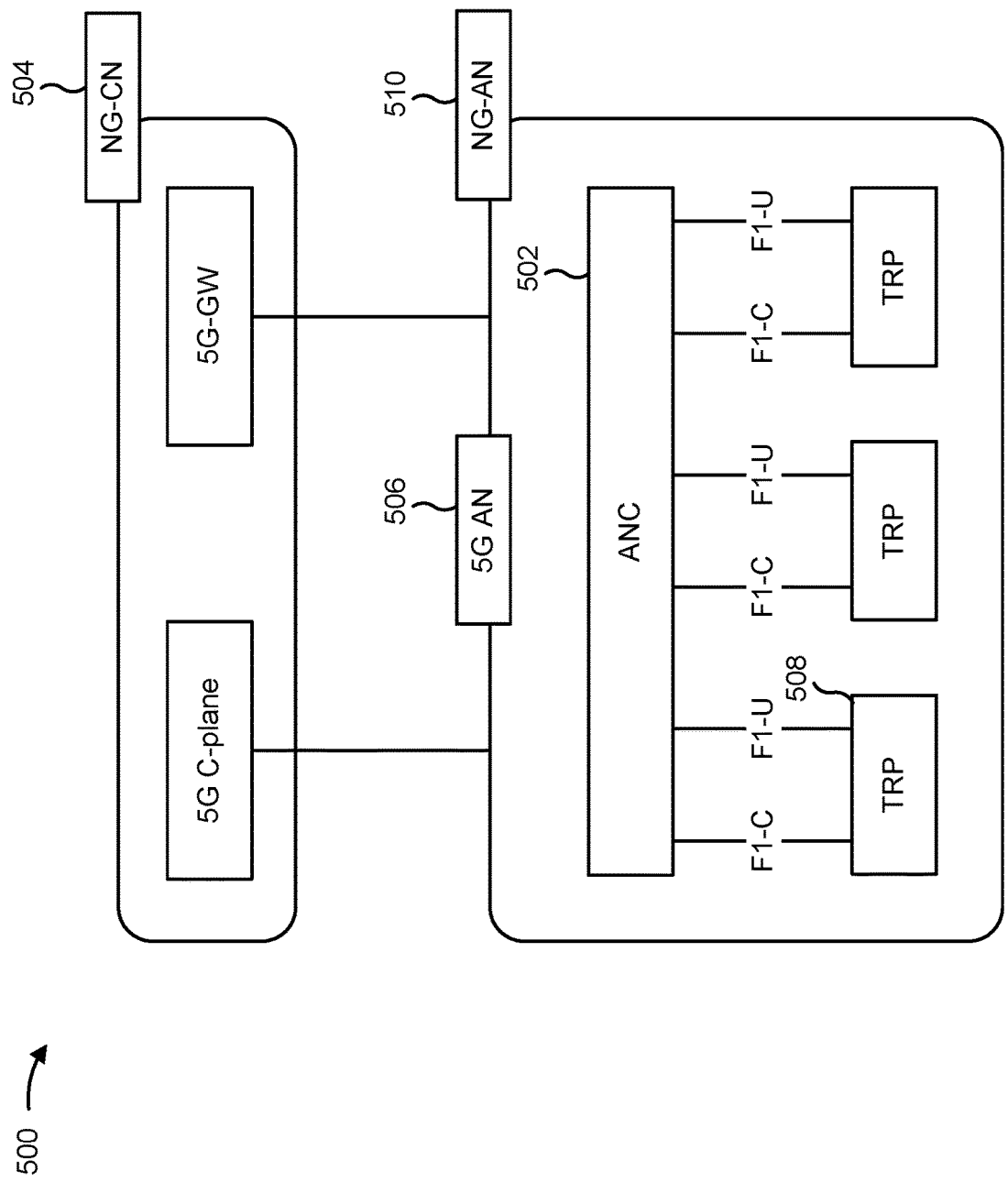
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
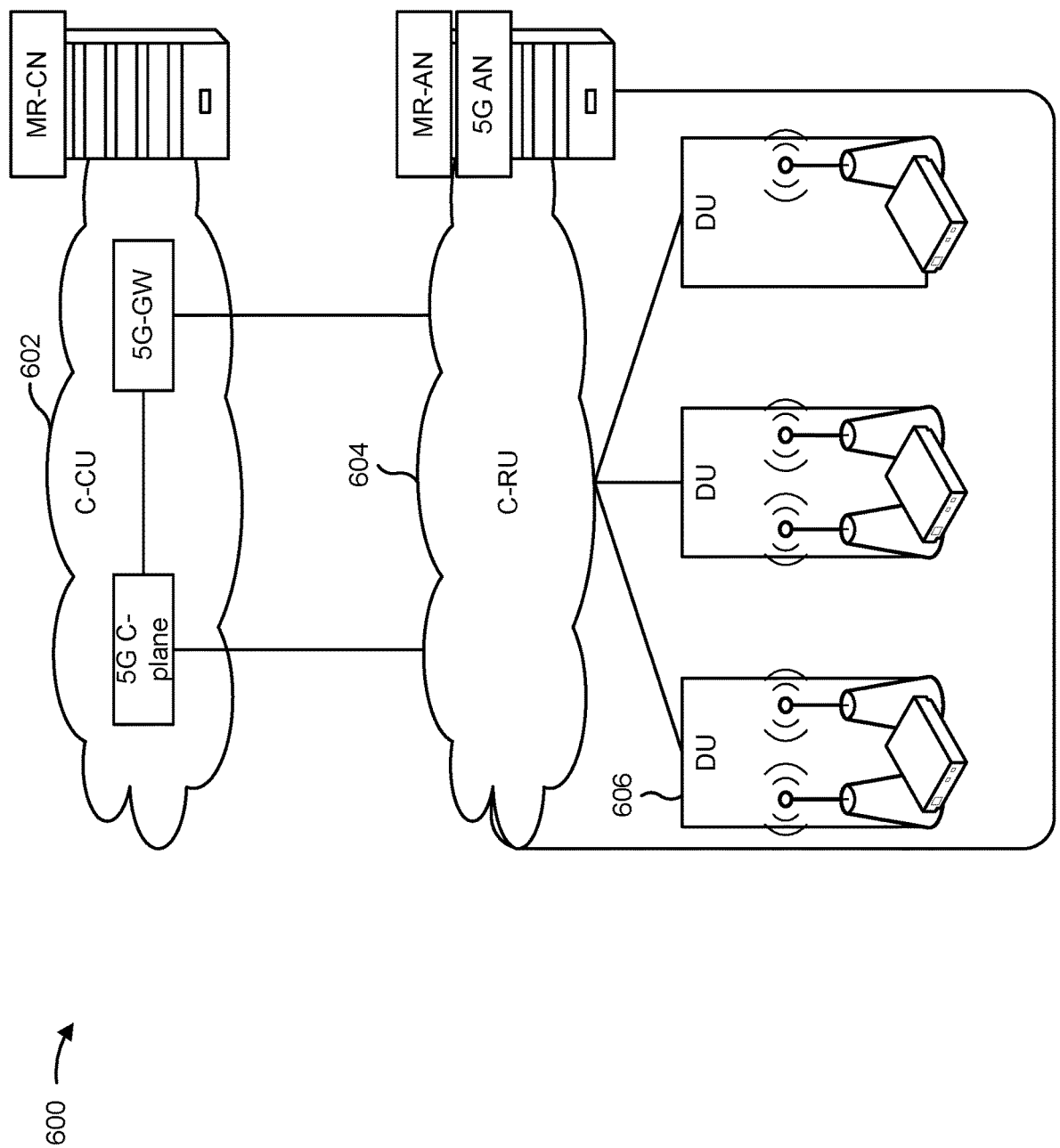
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, a UE and one or more TRPs may maintain synchronization using a set of timing advances (TAs). For example, the UE may apply a TA to a timing of an uplink transmission to account for a round trip time (RTT) delay. By applying the TA, the UE ensures that the uplink transmission is transmitted at a correct time with regard to allocated resources, TRP reception, and/or the like, thereby maintaining synchronization in a network. A BS (e.g., which may correspond to one or more of the one or more TRPs, as described above) may determine a TA and may provide the TA to the UE. For example, the BS may receive a physical random access channel (PRACH) transmission from the UE and determine an estimate of the RTT, from which the BS may determine a TA that the UE is to apply on subsequent transmissions. The BS may provide an indication of the TA to the UE in, for example, a physical downlink control channel (PDCCH) message type 2.

However, in multi-TRP operation, the RTT may differ for communications between the UE and different TRPs. For example, the BS may determine that a first communication link between the UE and a first TRP has a first RTT corresponding to a first TA, and that a second communication link between the UE and a second TRP has a second RTT corresponding to a second TA. In some cases, when the UE applies a single TA for uplink transmission to all TRPs, the UE may experience degraded uplink transmission as a result of being out of synchronization with other UEs with respect to some of the TRPs. In other words, when the UE applies the first TA on the second communication link, the first TA may cause transmissions by the UE to interfere with other transmissions by other UEs. In other cases, when the UE applies a plurality of TAs, the UE may transmit a plurality of uplink transmissions to a plurality of TRPs, which may result in excessive utilization of network traffic. Such a blind application of either a single TA or a plurality of TAs may result in poor network performance as a result of excessive network traffic and/or excessive interference.

Some aspects described herein enable BS-based configuration of a quantity of TAs that the UE is to apply. For example, the BS may determine a set of time differences for a set of PRACH signals received at a set of TRPs and may determine a quantity of TAs that the UE is to apply. In this way, the BS may determine groupings of TRPs to which the same TA is to apply, account for transmissions by other UEs, and/or the like. In this way, the BS may reduce a quantity of uplink transmissions when each TRP does not need a separate TA and may reduce a likelihood of interference when a TA is applied to a plurality of TRPs. Based at least in part on reducing the quantity of uplink transmissions and/or the likelihood of interference, the BS ensures improved network performance relative to the UE blindly applying a single TA or all possible TAs.

Figure 7:
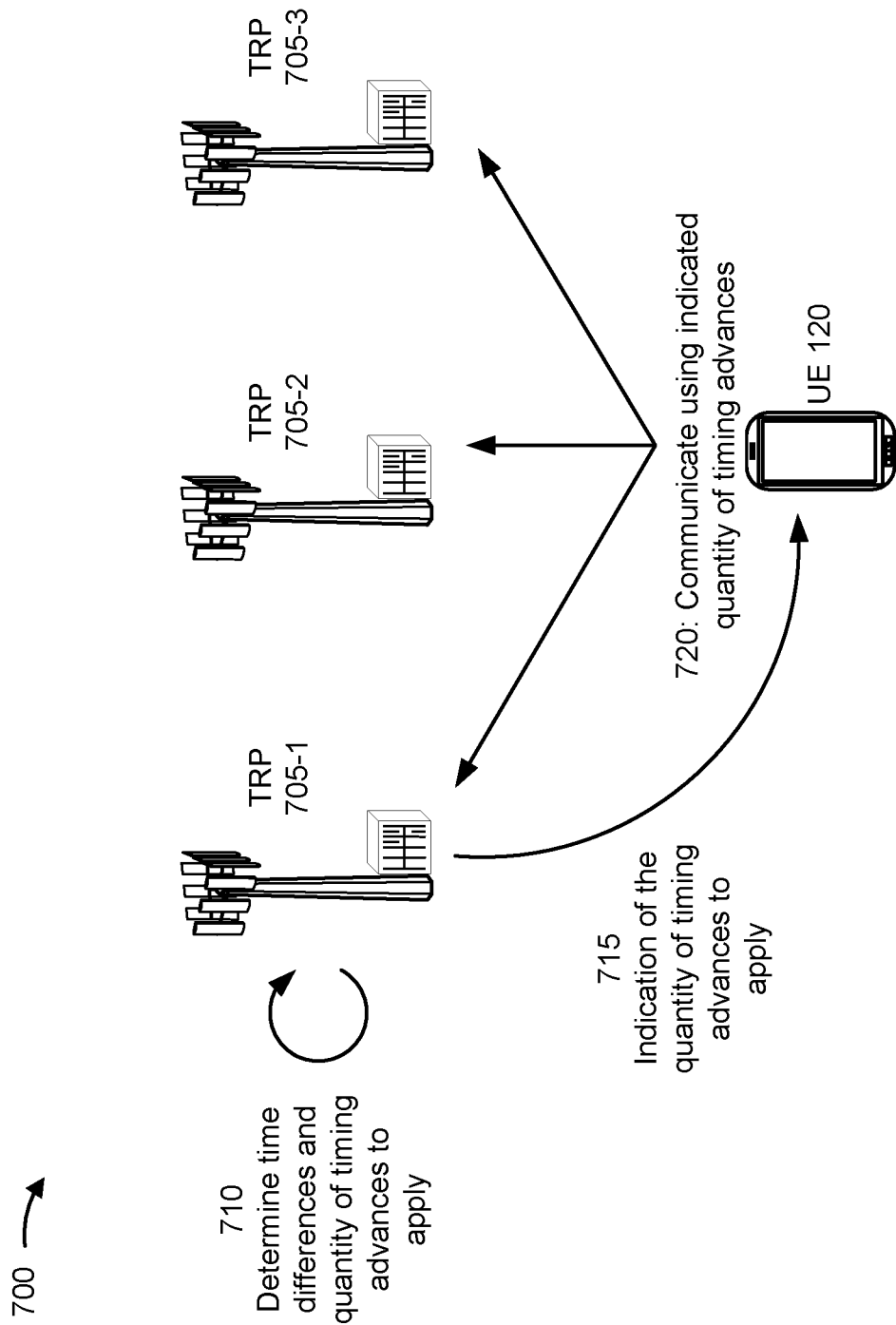
FIG. 7 is a diagram illustrating an example of timing advance signaling for multi-TRP operation, in accordance with various aspects of the present disclosure.

FIG. 7 is a diagram illustrating an example 700 of timing advance signaling for multi-TRP operation, in accordance with various aspects of the present disclosure. As shown in FIG. 7, example 700 may include a UE in communication with a plurality of TRPs 705 (e.g., TRPs 705-1, 705-2, and 705-3, which may be one or more BSs 110).

As further shown in FIG. 7, and by reference number 710, TRP 705-1 may determine time differences and a quantity of TAs that UE 120 is to apply. For example, TRPs 705 may receive a set of PRACH transmissions from UE 120 and/or one or more other UEs 120, and TRP 705-1 may determine one or more RTTs based at least in part on the set of PRACH transmissions. In this case, TRP 705-1 may determine one or more TAs corresponding to the one or more RTTs.

In some aspects, TRP 705-1 may group a plurality of TRPs 705 and may determine a single TA for the group of TRPs 705. For example, TRP 705-1 may determine that a set of TRPs 705 are associated with the same RTT or different RTTs that are within a threshold amount. In this case, TRP 705-1 may determine that applying a single TA to each TRP in the set of TRPs 705 is associated with less than a threshold likelihood of causing interference, based at least in part on each RTT being within the threshold amount. In this way, TRP 705-1 may avoid UE 120 transmitting separate transmissions to each TRP in the set of TRPs 705, thereby reducing network traffic. In contrast, TRP 705-1 may identify a particular TRP 705 with an RTT not within a threshold amount of the RTTs of the set of TRPs 705. In this case, TRP 705-1 may determine a TA for the particular TRP 705 that is different from the single TA for the set of TRPs 705. In this way, TRP 705-1 avoids UE 120 transmitting to the particular TRP 705 with the single TA, thereby reducing a likelihood of interference.

In some aspects, TRP 705-1 may identify RTTs and associated TAs for one or more other UEs 120 and may determine the quantity of TAs based at least in part on the associated TAs for the one or more other UEs 120. For example, TRP 705-1 may determine that a transmission by a first UE 120 using a first TA assigned for a group of TRPs 705 is associated with a threshold likelihood of interference with a second UE 120 using a second TA for transmission. In this case, TRP 705-1 may cause the first UE 120 to use a separate TA from the group of TRPs 705 to avoid interference with the second UE 120. In contrast, when TRP 705-1 determines that other UEs 120 are not to transmit within a threshold amount of time or within a threshold frequency band of the first UE 120, TRP 705-1 may cause the first UE 120 to use the first TA assigned for the group of TRPs 705 for the transmission, thereby reducing network traffic.

As further shown in FIG. 7, and by reference number 715, TRP 705-1 may provide an indication of the quantity of TAs that UE 120 is to apply. For example, TRP 705-1 may identify one or more TAs that UE 120 is to use and information identifying which one or more TRPs 705 are to be associated with each of the one or more TAs. In some aspects, TRP 705-1 may provide the indication via downlink control information (DCI). For example, TRP 705-1 may provide a PDCCH message 2 including DCI identifying a quantity of TAs and/or an association of TAs to TRPs 705. In some aspects, the DCI may indicate that one or more TRPs 705 are to apply a particular quantity of TAs for multi-TRP uplink transmission and may indicate an association of each TA with a corresponding TRP 705 or set of TRPs 705. Additionally, or alternatively, a set of TRPs 705 may provide information identifying a TA. For example, TRP 705-1 may provide information identifying a TA to use for TRP 705-1 and TRP 705-2 may provide information identifying a TA to use for TRPs 705-2 and 705-3. In some aspects, different TRPs 705 or subsets of TRPs 705 may transmit separate message 2 communications. For example, a first one or more TRPs 705 associated with a first TA may transmit a first message 2 communication (e.g., a PDCCH or PDSCH) and a second one or more TRPs 705 associated with a second TA may transmit a second message 2 communication. In this case, the message 2 communication may be directed to the same or different one or more target TRPs 705.

As further shown in FIG. 7, and by reference number 720, UE 120 may communicate using the indicated quantity of TAs. For example, UE 120 may apply one or more TAs to a set of uplink transmissions to a set of TRPs 705 based at least in part on receiving the indication of the quantity of timing advances to apply from TRP 705-1 and/or one or more other TRPs 705. In this way, UE 120 communicates in a multi-TRP deployment with a reduced utilization of network traffic and/or a reduced likelihood of interference relative to applying a TA for each TRP 705 and/or a single TA for all TRPs 705, respectively.

As indicated above, FIG. 7 is provided as an example. Other examples may differ from what is described with respect to FIG. 7.

Figure 8:
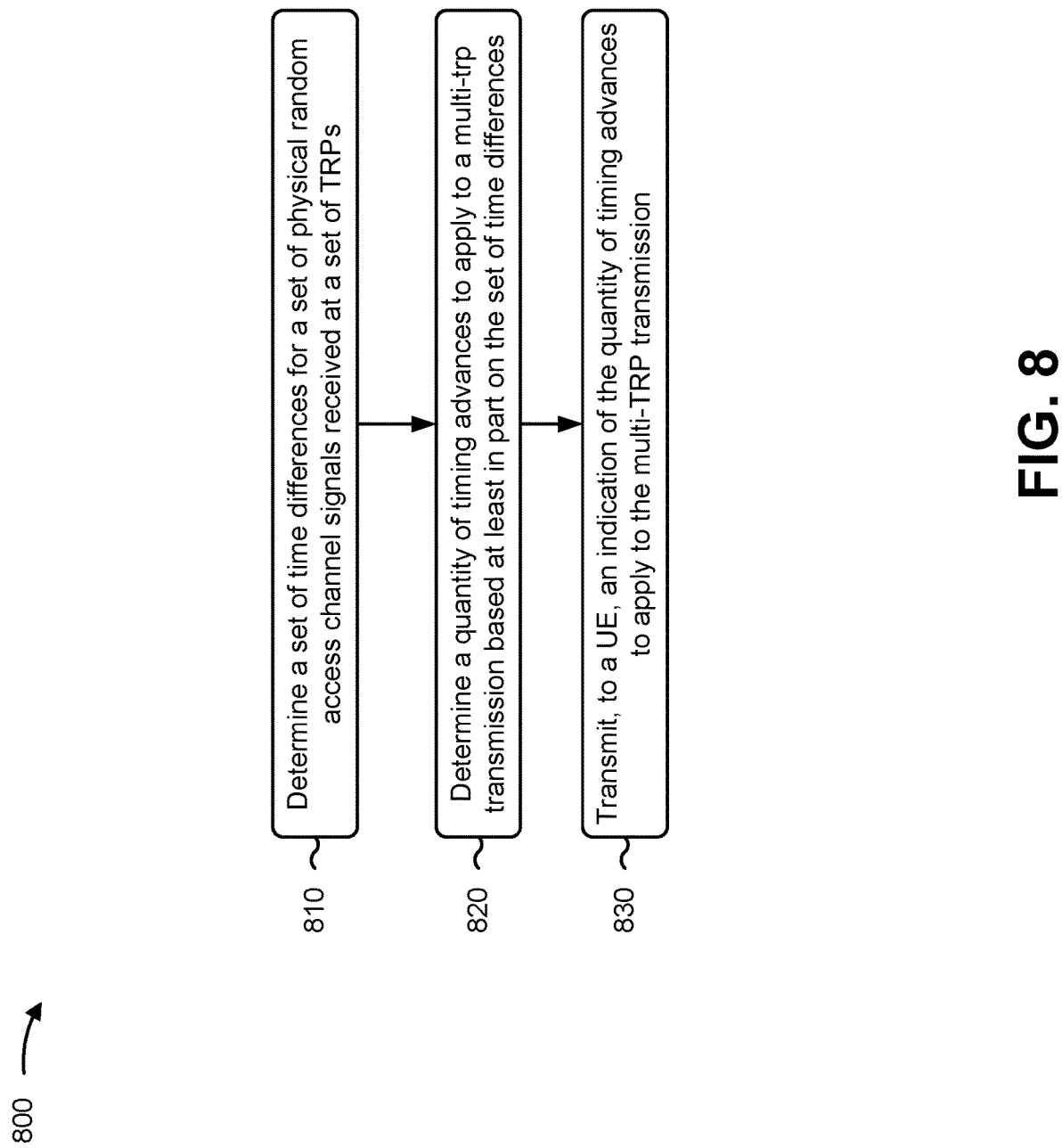
FIG. 8 is a diagram illustrating an example process performed, for example, by a base station, in accordance with various aspects of the present disclosure.

FIG. 8 is a diagram illustrating an example process 800 performed, for example, by a BS, in accordance with various aspects of the present disclosure. Example process 800 is an example where the BS (e.g., BS 110, TRPs 508, TRPs 705, and/or the like) performs operations associated with timing advance signaling for multi-TRP operation.

As shown in FIG. 8, in some aspects, process 800 may include determining a set of time differences for a set of physical random access channel signals received at a set of TRPs (block 810). For example, the BS (e.g., using transmit processor 220, receive processor 238, controller/processor 240, memory 242, and/or the like) may determine a set of time differences for a set of physical random access channel signals received at a set of TRPs, as described above.

As further shown in FIG. 8, in some aspects, process 800 may include determining a quantity of timing advances to apply to a multi-TRP transmission based at least in part on the set of time differences (block 820). For example, the BS (e.g., using transmit processor 220, receive processor 238, controller/processor 240, memory 242, and/or the like) may determine a quantity of timing advances to apply to a multi-TRP transmission based at least in part on the set of time differences, as described above.

As further shown in FIG. 8, in some aspects, process 800 may include transmitting, to a UE, an indication of the quantity of timing advances to apply to the multi-TRP transmission (block 830). For example, the BS (e.g., using transmit processor 220, receive processor 238, controller/processor 240, memory 242, and/or the like) may transmit, to a UE, an indication of the quantity of timing advances to apply to the multi-TRP transmission, as described above.

Process 800 may include additional aspects, such as any single aspect or any combination of aspects described below and/or in connection with one or more other processes described elsewhere herein.

In a first aspect, process 800 includes grouping a subset of the set of TRPs based at least in part on a corresponding subset of the set of time differences, and determining the quantity of timing advances includes determining the quantity of timing advances based at least in part on grouping the subset of the set of TRPs.

In a second aspect, alone or in combination with the first aspect, process 800 includes transmitting, to the UE, information identifying a mapping between the quantity of timing advances and the set of TRPs.

In a third aspect, alone or in combination with one or more of the first and second aspects, the indication of the quantity of timing advances is included in downlink control information of a physical downlink control channel message type 2.

In a fourth aspect, alone or in combination with one or more of the first through third aspects, transmitting the indication includes transmitting the indication via at least one TRP of the set of TRPs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
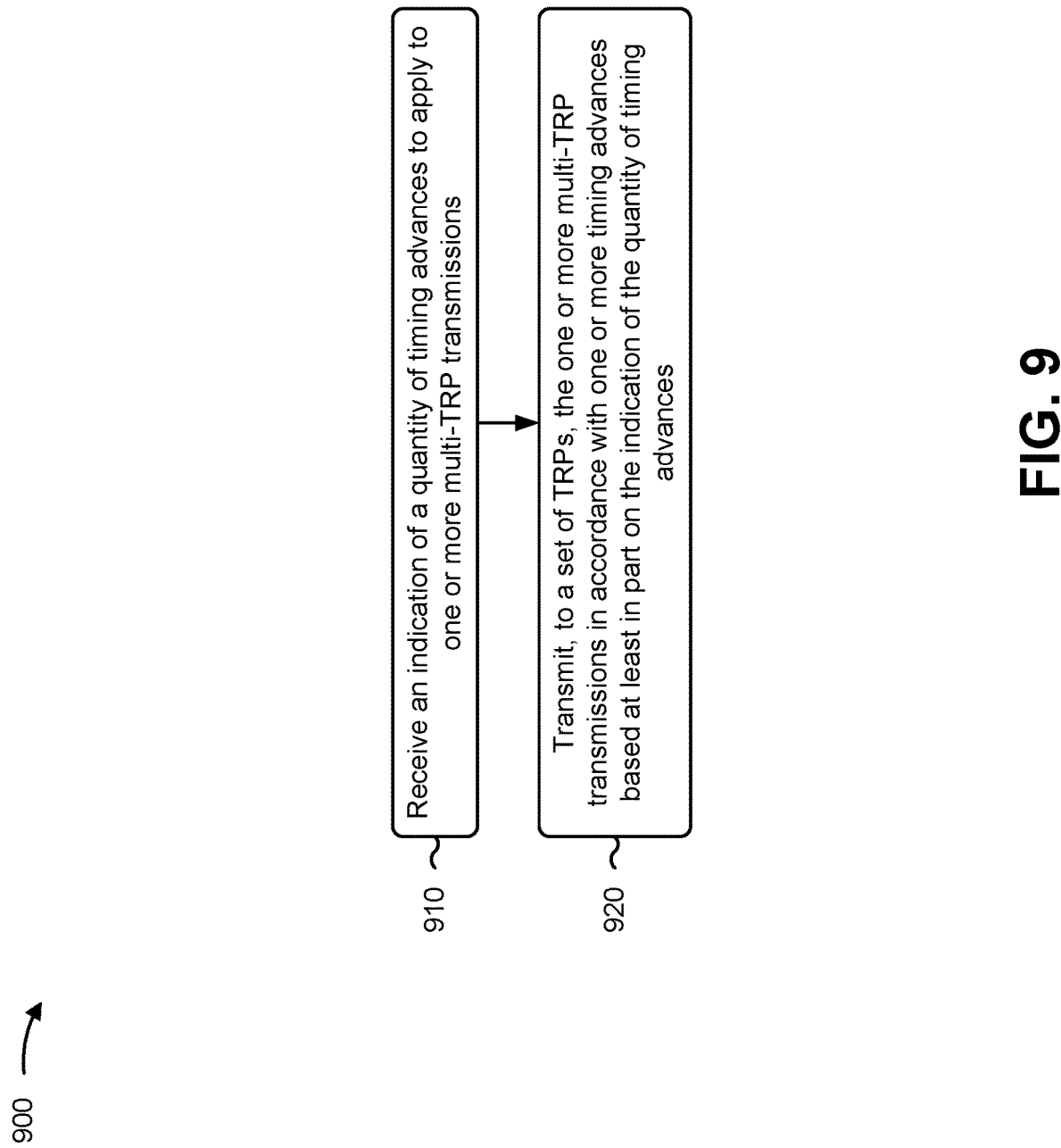
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with timing advance signaling for multi-transmit receive point operation.

As shown in FIG. 9, in some aspects, process 900 may include receiving an indication of a quantity of timing advances to apply to one or more TRP transmissions (block 910). For example, the UE (e.g., using antenna 252, DEMOD 254, MIMO detector 256, receive processor 258, controller/processor 280, and/or the like) may receive an indication of a quantity of timing advances to apply to one or more multi-TRP transmissions, as described above.

As further shown in FIG. 9, in some aspects, process 900 may include transmitting, to a set of TRPs, the one or more multi-TRP transmissions in accordance with one or more timing advances based at least in part on the indication of the quantity of timing advances (block 920). For example, the UE (e.g., using controller/processor 280, transmit processor 264, TX MIMO processor 266, MOD 254, antenna 252, and/or the like) may transmit, to a set of TRPs, the one or more multi-TRP transmissions in accordance with one or more timing advances based at least in part on the indication of the quantity of timing advances, as described above.

Process 900 may include additional aspects, such as any single aspect or any combination of aspects described below and/or in connection with one or more other processes described elsewhere herein.

In a first aspect, process 900 includes grouping a subset of the set of TRPs, and determining the quantity of timing advances includes transmitting a multi-TRP transmission, of the one or more multi-TRP transmissions, to the subset of the set of TRPs using a single timing advance of the one or more timing advances.

In a second aspect, alone or in combination with the first aspect, process 900 includes receiving information identifying a mapping between the quantity of timing advances and the set of TRPs.

In a third aspect, alone or in combination with one or more of the first and second aspects, the indication of the quantity of timing advances is included in downlink control information of a physical downlink control channel message type 2.

In a fourth aspect, alone or in combination with one or more of the first through third aspects, receiving the indication includes receiving the indication from at least one TRP of the set of TRPs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining a set of time differences for a set of physical random access channel signals received from a plurality of user equipment (UEs) and at a plurality of transmit receive points (TRPs);
   grouping a subset of TRPs in the plurality of TRPs based at least in part on a threshold likelihood of causing interference;
   determining, based at least in part on grouping the subset of TRPs, a quantity of timing advances that a user equipment (UE) is to apply to a multi-TRP transmission to the plurality of TRPs based at least in part on the set of time differences; and
   transmitting, to the UE, an indication of the quantity of timing advances to apply to the multi-TRP transmission.

2. The method of claim 1, wherein grouping the subset of TRPs further comprises:
   grouping the subset of TRPs in the plurality of TRPs based at least in part on a corresponding subset of time differences in the set of time differences.

3. The method of claim 1, further comprising:
   transmitting, to the UE, information identifying a mapping between the quantity of timing advances and the plurality of TRPs.

4. The method of claim 1, wherein the indication of the quantity of timing advances is included in downlink control information of a physical downlink control channel message type 2.

5. The method of claim 1, wherein transmitting the indication comprises:
   transmitting the indication via at least one TRP of the plurality of TRPs.

6. A method of wireless communication performed by a user equipment (UE), comprising:
   receiving an indication of a quantity of timing advances to apply to one or more multi-transmit receive point (TRP) transmissions;
   receiving information identifying a mapping between the quantity of timing advances and a plurality of TRPs based at least in part on a threshold likelihood of causing interference; and
   transmitting, to the plurality of TRPs, the one or more multi-TRP transmissions in accordance with one or more timing advances based at least in part on the indication of the quantity of timing advances,
   wherein the quantity of timing advances is based at least in part on a set of physical random access channel signals received from a plurality of user equipment (UEs) and at the plurality of TRPs.

7. The method of claim 6, further comprising:
   grouping a subset of TRPs in the plurality of TRPs; and
   transmitting a multi-TRP transmission, of the one or more multi-TRP transmissions, to the subset of TRPs using a single timing advance of the one or more timing advances.

8. The method of claim 6, wherein the indication of the quantity of timing advances is included in downlink control information of a physical downlink control channel message type 2.

9. The method of claim 6, wherein receiving the indication comprises:
   receiving the indication from at least one TRP of the plurality of TRPs.

10. A network entity for wireless communication, comprising:
    one or more memories; and
    one or more processors coupled to the one or more memories, the one or more processors configured to:
       determine a set of time differences for a set of physical random access channel signals received from a plurality of user equipment (UEs) and at a plurality of transmit receive points (TRPs);
       group a subset of TRPs in the plurality of TRPs based at least in part on a threshold likelihood of causing interference;
       determine, based at least in part on grouping the subset of TRPs, a quantity of timing advances that a user equipment (UE) is to apply to a multi-TRP transmission to the plurality of TRPs based at least in part on the set of time differences; and
       transmit, to the UE, an indication of the quantity of timing advances to apply to the multi-TRP transmission.

11. The network entity of claim 10, wherein, to group the subset of TRPs, the one or more processors are further configured to:
    group the subset of TRPs in of the plurality of TRPs based at least in part on a corresponding subset of time differences in the set of time differences.

12. The network entity of claim 10, wherein the one or more processors are further configured to:
    transmit, to the UE, information identifying a mapping between the quantity of timing advances and the plurality of TRPs.

13. The network entity of claim 10, wherein the indication of the quantity of timing advances is included in downlink control information of a physical downlink control channel message type 2.

14. The network entity of claim 10, wherein the one or more processors, when transmitting the indication, are configured to:
    transmit the indication via at least one TRP of the plurality of TRPs.

15. A user equipment (UE) for wireless communication, comprising:
    one or more memories; and
    one or more processors coupled to the one or more memories, the one or more processors configured to:

receive an indication of a quantity of timing advances to apply to one or more multi-transmit receive point (TRP) transmissions;

receive information identifying a mapping between the quantity of timing advances and a plurality of TRPs based at least in part on a threshold likelihood of causing interference; and transmit, to the plurality of TRPs, the one or more multi-TRP transmissions in accordance with one or more timing advances based at least in part on the indication of the quantity of timing advances, wherein the quantity of timing advances is based at least in part on a set of physical random access channel signals received from a plurality of user equipment (UEs) and at the plurality of TRPs.

16. The UE of claim 15, wherein the one or more processors are further configured to:
group a subset of TRPs in the plurality of TRPs; and
transmit a multi-TRP transmission, of the one or more multi-TRP transmissions, to the subset of TRPs using a single timing advance of the one or more timing advances.

17. The UE of claim 15, wherein the indication of the quantity of timing advances is included in downlink control information of a physical downlink control channel message type 2.

18. The UE of claim 15, wherein the one or more processors, when receiving the indication, are configured to:
receive the indication from at least one TRP of the plurality of TRPs.

19. The method of claim 1, wherein grouping the subset of TRPs further comprises:
grouping the subset of TRPs in the plurality of TRPs based at least in part on a determination that the subset of TRPs are associated with round trip times that are within a threshold amount.

20. The network entity of claim 10, wherein, to group the subset of TRPs, the one or more processors are further configured to:
group the subset of TRPs in of the plurality of TRPs based at least in part on a determination that the subset of TRPs are associated with round trip times that are within a threshold amount.

* * * * *